(12) United States Patent
Sabato et al.

(10) Patent No.: US 12,197,918 B2
(45) Date of Patent: *Jan. 14, 2025

(54) COMMAND-AWARE HARDWARE ARCHITECTURE

(71) Applicant: Lilac Cloud, Inc., Cupertino, CA (US)

(72) Inventors: Simon Luigi Sabato, Saratoga, CA (US); Jay Shah, Morgan Hill, CA (US); Harish Ramamurthy Devanagondi, Saratoga, CA (US); Jui-Yang Lu, Fremont, CA (US)

(73) Assignee: Lilac Cloud, Inc., Cupertino, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/724,282

(22) Filed: Apr. 19, 2022

(65) Prior Publication Data

US 2022/0244964 A1     Aug. 4, 2022

Related U.S. Application Data

(63) Continuation of application No. 16/921,165, filed on Jul. 6, 2020, now Pat. No. 11,340,907.

(51) Int. Cl.
| | |
|---|---|
| *G06F 9/38* | (2018.01) |
| *G06F 9/50* | (2006.01) |
| *G06F 9/54* | (2006.01) |

(52) U.S. Cl.
CPC .......... *G06F 9/3836* (2013.01); *G06F 9/3824* (2013.01); *G06F 9/3877* (2013.01); *G06F 9/5016* (2013.01); *G06F 9/5072* (2013.01); *G06F 9/544* (2013.01)

(58) Field of Classification Search
CPC ...................................................... G06F 9/3836
See application file for complete search history.

(56) References Cited

U.S. PATENT DOCUMENTS

| | | |
|---|---|---|
| 5,732,273 A | 3/1998 | Srivastava et al. |
| 5,774,728 A | 6/1998 | Breslau et al. |
| 8,418,155 B2 | 4/2013 | McAllister et al. |

(Continued)

FOREIGN PATENT DOCUMENTS

WO      2016/116132 A1      7/2016

*Primary Examiner* — Michael J Metzger
(74) *Attorney, Agent, or Firm* — Troutman Pepper Hamilton Sanders LLP

(57) ABSTRACT

In an embodiment, responsive to determining: (a) a first command is not of a particular command type associated with one or more hardware modules associated with a particular routing node, or (b) at least one argument used for executing the first command is not available: transmitting the first command to another routing node in the hardware routing mesh. Upon receiving a second command of the command bundle and determining: (a) the second command is of the particular command type associated with the hardware module(s), and (b) arguments used by the second command are available: transmitting the second command to the hardware module(s) associated with the particular routing node for execution by the hardware module(s). Thereafter, the command bundle is modified based on execution of the second command by at least refraining from transmitting the second command of the command bundle to any other routing nodes in the hardware routing mesh.

20 Claims, 10 Drawing Sheets

(56) References Cited

U.S. PATENT DOCUMENTS

| | | |
|---|---|---|
| 8,468,510 B1 | 6/2013 | Sundararajan et al. |
| 9,563,754 B2 | 2/2017 | Colnot et al. |
| 9,946,657 B1 | 4/2018 | Muthukkaruppan et al. |
| 10,120,661 B2 | 11/2018 | Sandberg et al. |
| 10,162,626 B2 | 12/2018 | Mavrinac et al. |
| 10,235,291 B1 | 3/2019 | Michaud et al. |
| 10,270,878 B1 | 4/2019 | Uppal et al. |
| 10,404,823 B2 | 9/2019 | Busayarat et al. |
| 10,412,110 B2 | 9/2019 | Hamdi |
| 10,531,130 B2 | 1/2020 | Beck |
| 10,873,516 B2 | 12/2020 | Lemmons |
| 10,938,884 B1 | 3/2021 | Baldwin et al. |
| 10,942,852 B1 | 3/2021 | Tian |
| 10,958,700 B1 | 3/2021 | Hassler |
| 10,963,388 B2 | 3/2021 | Sinha et al. |
| 10,972,761 B2 | 4/2021 | Ra et al. |
| 11,030,104 B1 | 6/2021 | Gupta et al. |
| 11,032,581 B2 | 6/2021 | Beck |
| 11,061,828 B1 | 7/2021 | Peterson et al. |
| 11,070,603 B2 | 7/2021 | Panagos et al. |
| 11,086,960 B2 | 8/2021 | Newton |
| 11,109,101 B1 | 8/2021 | Binder et al. |
| 11,128,728 B2 | 9/2021 | Luft |
| 11,134,134 B2 | 9/2021 | Uppal et al. |
| 11,146,654 B2 | 10/2021 | Busayarat et al. |
| 11,151,058 B2 | 10/2021 | Gupta et al. |
| 11,159,404 B1 | 10/2021 | Kuo et al. |
| 11,218,504 B2 | 1/2022 | Hamdi |
| 11,218,561 B1 | 1/2022 | Mondal et al. |
| 11,252,253 B2 | 2/2022 | Luft |
| 11,281,804 B1 | 3/2022 | Uthaman et al. |
| 11,297,119 B2 | 4/2022 | Hassler |
| 11,310,334 B1 | 4/2022 | Adolphson et al. |
| 11,323,536 B2 | 5/2022 | Luft |
| 11,349,737 B2 | 5/2022 | Lemmons |
| 11,356,712 B2 | 6/2022 | Ra et al. |
| 11,388,252 B2 | 7/2022 | Luft |
| 11,481,825 B1 | 10/2022 | Mokashi et al. |
| 2012/0126851 A1* | 5/2012 | Kelem ............... H03K 19/007 326/38 |
| 2016/0188340 A1* | 6/2016 | Fushimi ............... G06F 9/46 712/225 |
| 2017/0052830 A1 | 2/2017 | Gambardella et al. |
| 2020/0259918 A1 | 8/2020 | Luft |
| 2021/0224200 A1 | 7/2021 | Gupta et al. |
| 2021/0227264 A1 | 7/2021 | Ra et al. |
| 2021/0255964 A1 | 8/2021 | Gupta et al. |
| 2021/0255965 A1 | 8/2021 | Gupta et al. |
| 2021/0255967 A1 | 8/2021 | Gupta et al. |
| 2021/0263863 A1 | 8/2021 | Peterson et al. |
| 2021/0279174 A1 | 9/2021 | Peterson et al. |
| 2022/0019440 A1 | 1/2022 | Gorti et al. |
| 2022/0027267 A1 | 1/2022 | Gupta et al. |
| 2022/0027272 A1 | 1/2022 | Ki et al. |
| 2022/0188174 A1 | 6/2022 | Bairavasundaram et al. |
| 2022/0188242 A1 | 6/2022 | Tanpairoj et al. |

\* cited by examiner

COMMAND-AWARE HARDWARE ARCHITECTURE

INCORPORATION BY REFERENCE; DISCLAIMER

The following application is hereby incorporated by reference: application Ser. No. 16/921,165 filed on Jul. 6, 2020. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to hardware processors, and more particularly to accelerating compute functions performed by one or more hardware processors using a command-aware hardware architecture.

BACKGROUND

In many computer architectures, a central processing unit (CPU) is used as the primary processor for performing and executing instructions from software applications. In these computer architectures, for any given software application, various compute functions provided by the application are implemented on the CPUs and the processing power of the CPU(s) limits the performance of the software application.

However, in some computer architectures, a portion of the application's compute functions may be offloaded from the CPU(s) to other processing devices, such as application specific integrated circuits (ASICs), graphics processing units (GPUs), and field programmable gate arrays (FPGAs). This offloading is intended to free up processing resources on the CPU(s) and to improve performance of the software application.

BRIEF DESCRIPTION OF THE DRAWINGS

Reference symbols in the various drawings that have the same number indicate like elements.

DETAILED DESCRIPTION

Figure 1:
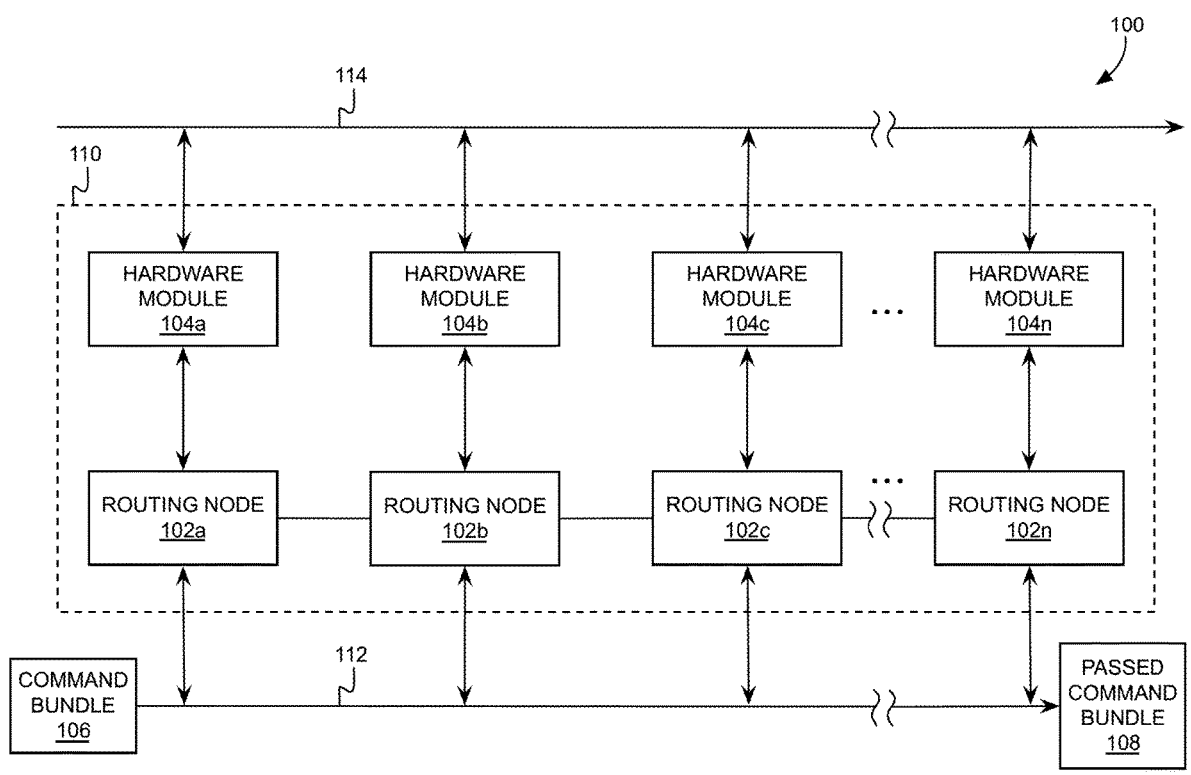
FIG. 1 illustrates an example hardware pipeline for processing commands.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. SYSTEM ARCHITECTURE
   2.1 HARDWARE PIPELINE
   2.2 COMMAND BUNDLE
   2.3 SYSTEM OVERVIEW
3. EXAMPLE EMBODIMENTS
   3.1 HARDWARE ROUTING MESH
   3.2 METHOD FOR PROCESSING A COMMAND
   3.3 METHOD FOR TRAVERSING A COMMAND BUNDLE
4. MISCELLANEOUS; EXTENSIONS
5. HARDWARE OVERVIEW

1. GENERAL OVERVIEW

One or more embodiments present a hardware routing mesh that includes sets of routing nodes that form one or more hardware pipelines. Many hardware pipelines may be included in the hardware routing mesh. Commands, grouped together in a command bundle, are streamed through a hardware pipeline via a control path. The command bundle is modified by the routing nodes based on execution of commands to achieve a desired outcome.

Each routing node within a hardware pipeline is associated with one or more hardware modules for processing commands. A routing node forwards commands to another routing node in the hardware routing mesh when (a) a command is not of a command type relevant to associated hardware module(s), or (b) all data needed to execute the command is not available when the command is received.

Moreover, a routing node transmits commands to at least one hardware module associated with the routing node for execution when (a) a command is of the command type relevant to associated hardware module(s), and (b) all data needed to execute the command is available when the command is received. Thereafter, the routing node modifies the command bundle based on execution of the command.

A routing node may also traverse a received command bundle to determine whether any commands of a particular command type relevant to associated hardware module(s) are included in the command bundle. When no commands of the particular command type are in the command bundle, the routing node transmits the command bundle, without modification, to a next routing node in the hardware pipeline.

This Specification may include, and the claims may recite, some embodiments beyond those that are described in this General Overview section.

2. SYSTEM ARCHITECTURE

A plurality of software applications may be executing on a computer system at any given time. Each software application provides a plurality of compute functions for execution by a processor of the computer system. For simplicity, it is assumed that a software application's compute functions may be divided into three different classes based on the computer system's architecture and ability to implement the compute functions: CPU-based architecture functions (for CPU implementation), GPU-based architecture functions (for GPU implementation), and hard program-based architecture functions (for ASIC and/or FPGA implementation).

CPUs and GPUs are built using well-defined architectures that are optimized for the class of compute functions they are most commonly expected to execute. This provides a common programming paradigm for software developers to build applications for CPUs and GPUs. However, a well-defined architecture does not exist for applications using FPGA-based platforms and/or ASIC-based platforms.

The methodology for how each ASIC-based platform and FPGA-based platform handle specific architectural attributes is unique to each application (e.g., custom for the application it is designed for). For example, each of these platform characteristics may be designed differently for any given ASIC-based platform and FPGA-based platform:
  1) Connections to external interfaces, e.g., interfaces to memory, peripheral component interconnect express (PCIe), media access control (MAC), etc.
  2) Transport and routing between compute functions
  3) Definition of instructions and data to execute compute functions
  4) Data coherency checks
  5) Data integrity checks
  6) Performance optimizations
  7) Debugging infrastructure With an ASIC, the underlying design of compute functions, along with the definition and placement of the compute functions is predetermined and fixed. Therefore, these aspects of a typical ASIC cannot be reprogrammed or changed after manufacturing the ASIC. On the other hand, an FPGA may be reprogrammed after manufacture. However, every time a change is enacted to an existing compute function, and every time a new compute function is added, the underlying FPGA design is changed to accommodate these modified or added compute functions. This means that changes to typical ASIC-based platforms and FPGA-based platforms are expensive, e.g., they take time, have great complexity, and require tedious effort. Ultimately, these changes may lead to variability in performance and stability of the platform.

Therefore, for typical ASIC-based platforms and FPGA-based platforms, there is no common architecture or design system that software developers are able to utilize to build applications (unlike CPUs and GPUs).

An FPGA is a platform that is capable of being reprogrammed to create and combine custom accelerated compute functions that may be modified over and over again. In that sense, it is unlike a CPU, GPU, or ASIC whose architecture is designed and fixed by the vendor. FPGA compute functions may be developed independently by different independent developers, as opposed to a few large companies in the case of CPUs and GPUs, and put together in flexible ways to provide offloaded processing capacity for a range of applications.

However, for typical FPGA implementations, this is not possible. It may be difficult to arbitrarily combine compute modules developed by different developers within the same organization and installations, and nearly impossible across different organizations. This difficulty stems from the compute modules for these different FPGAs not being designed with a common interface or a common way of passing control and data between FPGAs and other processors.

2.1. Hardware Pipeline

FIG. 1 illustrates an example hardware pipeline 100 for processing commands in accordance with one or more embodiments. Hardware pipeline 100 presents a universal processor architecture that may be instantiated on an FPGA and/or ASIC-based platform, and may be optimized for the compute functions that are most commonly offloaded to the particular platform. As illustrated in FIG. 1, hardware pipeline 100 includes multiple routing nodes 102 (e.g., routing node 102a, routing node 102b, routing node 102c, . . . , routing node 102n). Each routing node 102 is associated with a respective hardware module 104 (e.g., hardware module 104a, hardware module 104b, hardware module 104c, . . . , hardware module 104n) and is connected to its respective hardware module 104 for transmission of data/information between the routing node 102 and hardware module 104. For example, routing node 102a is communicatively coupled with hardware module 104a, routing node 102b is communicatively coupled with hardware module 104b, etc.

A routing node 102 is a hardware device configured to receive a command bundle 106 via a control path 112. The control path 112 is connected to each of the routing nodes 102. Moreover, although the routing nodes 102 are shown being connected to the control path 112 and serially to one another, the routing nodes 102 may be selectively interconnected to one another in a hardware routing mesh capable of being modified dynamically to rearrange the order of the routing nodes 102 in the hardware pipeline 100. By rearranging the order of the routing nodes 102, it is possible to change how commands within the command bundle 106 are processed by the hardware pipeline 100, as described in more detail with reference to FIG. 2.

Referring again to FIG. 1, a command bundle 106 is streamed through the various routing nodes 102 in the order in which they are connected to the control path 112. The command bundle 106 is modified based on execution of commands from the command bundle 106 as the command bundle 106 is streamed through the various routing nodes 102. For example, if routing node 102b performs a specific command from the command bundle 106, this specific command may be removed from the command bundle 106 before being passed to the next routing node 102c (shown as passed command bundle 108 after being passed through each routing node 102 once).

In one embodiment, the command bundle 106 is passed through each routing node 102 along the control path 112, with each routing node 102 traversing the command bundle 106 to determine whether there are any commands that are able to be executed by a hardware module 104 connected to the routing node 102.

In another embodiment, individual commands of the command bundle 106 may be selectively provided to different routing nodes 102 for parallel execution by one or more hardware module(s) 104 coupled to the different routing nodes concurrently or at nearly the same time based on slight differences in when the commands are actually received by the different routing nodes 102 and/or hardware modules 104. In this embodiment, a pipeline router may be utilized to determine which hardware pipeline (and therefore which routing nodes 102) to send the individual commands for execution thereof. The pipeline router is described in more detail with respect to FIG. 3A.

Referring again to FIG. 1, according to another embodiment, a load balancer may determine which hardware module 104 to send individual commands of the command bundle 106 for parallel execution by the different hardware modules 104 concurrently or at nearly the same time. In this embodiment, the different hardware modules 104 may be configured to execute the same type of command or similar command types, e.g., decrypt/encrypt, fetch/store, compress/decompress, etc. The load balancer is described in more detail with respect to FIG. 3B.

Referring again to FIG. 1, in an example, one of the routing nodes (e.g., routing node 102a) may be configured to receive a particular type of command from the command bundle 106 to be processed and/or executed by hardware module 104a. Responsive to routing node 102a determining that (a) the first command of command bundle 106 is not of the particular command type associated with hardware module 104a, or (b) at least one argument used for executing the first command is not received in association with the first command, routing node 102a transmits the first command from the command bundle 106 to a next routing node in the order of connection to the control path 112 (e.g., routing node 102b).

According to one example, routing node 102a may receive a second command of the command bundle 106, and responsive to determining that (a) the second command is of the particular command type associated with hardware module 104a, and (b) argument(s) (if any) used by the second command are received in association with the second command (e.g., via data path 114 and/or control path 112), routing node 102a may transmit the second command to hardware module 104a for processing and/or execution by the hardware module 104a. Upon successful execution, routing node 102a and/or hardware module 104a may modify the command bundle 106 based on execution of the second command.

In an approach, when a hardware module is associated with a command type, or vice versa, it indicates that the hardware module is configured to process and/or execute that particular type of command. This processing or execution may produce one or more results, end a process, start a process, trigger another command to execute, etc.

Many different command types are possible for execution by different hardware modules 104. Each hardware module 104 may designed and configured to perform one type of command, or it may be configured to execute multiple command types that are similar, such as encrypt/decrypt, fetch/store, compress/decompress, etc. A non-exhaustive list of command types includes: an encrypt command, a decrypt command, an encode command, a decode command, a compress command, a decompress command, a fetch command, a store command, a configure command, a lookup command, a compare command, etc.

According to one approach, the command bundle 106 may be modified through one or more actions, with the possible actions being wide-ranging. For example, the command bundle 106 may be modified by refraining from transmitting the second command of the command bundle 106 to the next routing node in the order of connection to the control path 112 (e.g., routing node 102b).

Other forms of modification of the command bundle 106 are possible, such as deletion or removal of the second command, modification of the second command, inclusion of one or more arguments within the command bundle 106 (e.g., as command data), inclusion of an implicit or explicit indicator (marker, note, pointer, flag, etc.) within the command bundle 106 denoting execution of the second command, storing a result of executing the second command in a dataset (e.g., on the data path 114) associated with the second command of the command bundle 106, storing an implicit or explicit indicator for the result in the command bundle 106, addition of a data command in place of the second command in the command bundle 106, addition of the data command in addition to the second command in the command bundle 106, generating a new command bundle that includes no commands (a null bundle), etc.

A data command, as used herein, refers to a command that may be added to a command bundle which refers to a location (e.g., a FPGA memory address, CPU memory address, GPU memory address, etc.) to access a result of executing a command from the command bundle.

In another example, routing node 102b, which is communicatively coupled to hardware module 104b may be configured to receive the command bundle 106 after it has passed through routing node 102a from control path 112. Routing node 102b is configured to traverse the command bundle 106 to determine if any commands in the command bundle 106 are of a command type associated with hardware module 104b. For this example, a second command type is associated with hardware module 104b.

Responsive to routing node 102b determining that the command bundle 106 does not include any commands of the second command type associated with hardware module 104b, routing node 102b transmits the command bundle 106, without modification as it was received from routing node 102a, to a next routing node 102 in the hardware pipeline 100 (e.g., routing node 102c).

In another example, responsive to routing node 102b detecting that command bundle 106 includes a specific command of the second command type, routing node 102b will determine whether the specific command uses any parameters. Each command may reference one or more parameters (e.g., a set of parameters) that are used in execution of the command. For example, a fetch command may need an address to find a particular file, or an encode command may need an argument to encode that is not present in the command itself (even if the encoding algorithm is present in the command). In order for such a command to be executed by a hardware module, each parameter must be available to the hardware module.

Sometimes, one or more of the parameters is not available. This may be due to the parameter not being determined yet through execution of a separate command, the parameter not being passed to the hardware module, a pointer to the parameter being faulty, outdated, or broken, the parameter failing to meet certain requirements of the command, etc. When this situation arises, the command is not able to be executed, and the command bundle 106 is passed to the next routing node 102.

In an example, in response to routing node 102b failing to detect at least one parameter value in the set of parameters (and therefore not being able to process the related command from the command bundle 106), the routing node 102b may transmit the command bundle 106, as it was received without modification, to a next routing node 102 in the hardware pipeline 100 (e.g., routing node 102c).

Hardware pipeline 100 may be designed to recycle or recirculate the passed command bundle 108 back to the beginning of the control path 112 once it has traversed through each routing node 102 in hardware pipeline 100. In this way, the passed command bundle 108 will be passed back to routing node 102a one or more times (the total number of recirculations), depending on a configuration of the hardware pipeline 100.

In one embodiment, hardware pipeline 100 may be configured to attempt to process each command in the command bundle 106 (and any commands remaining in the passed command bundle 108 after traversing through the hardware pipeline 100) until the earliest of: all commands have been processed, the command bundle 106 has been passed through hardware pipeline 100 a predetermined number of times (e.g., two times, three times, four times, five times, etc.), or a predetermined amount of time has elapsed (e.g., 100 microseconds, 10 milliseconds, 1 second, 10 seconds, 30 seconds, etc.) since the command bundle 106 was introduced to the hardware pipeline 100, etc.

In one example, subsequent to transmitting the command bundle 106 to the last routing node 102n, hardware pipeline 100 is configured to send the passed command bundle 108 back to routing node 102a. Routing node 102a processes the passed command bundle 108 in the same way that it processed command bundle 106 the first time. In the case where commands exist in the passed command bundle 108 after processing by routing node 102a, routing node 102a will pass the passed command bundle 108 to routing node 102b.

Routing node 102b, upon receiving the passed command bundle 108 (all commands remaining from command bundle 106 after passing along the control path 112 through hardware pipeline 100), routing node 102b traverses the passed command bundle 108 to detect a specific command of the second command type associated with hardware module 104b within the passed command bundle 108. This may be the same command of the second command type that was analyzed previously by routing node 102b, but not processed due to one or more missing parameter values. When routing node 102b receives the specific command this time, upon detecting that all values of the set of one or more values corresponding to the set of parameters for the specific command are available, routing node 102b executes the specific command based on the set of one or more values. After executing the specific command from the passed command bundle 108, routing node 102b modifies the passed command bundle 108 based on execution of the specific command and transmits the modified passed command bundle 108 to the next routing node along the control path 112 (e.g., routing node 102c).

In one or more embodiments, the hardware pipeline 100 may include more or fewer components than the components illustrated in FIG. 1. The components illustrated in FIG. 1 may be local to or remote from each other. The components illustrated in FIG. 1 may be implemented in hardware with or without the aid of software-defined rules. Each component may be used to accelerate multiple applications. Multiple components may be used to accelerate any single application. Operations described with respect to one component may instead be performed by another component.

Moreover, the hardware pipeline 100 may be leveraged in a common architecture for use by any accelerated application executing on a computer system. Hardware pipeline 100 may also respond to a common programming paradigm used by software developers to program the hardware pipeline 100 to perform desired compute functions (similar to CPUs and GPUs).

2.2. Command Bundle

Figure 2:
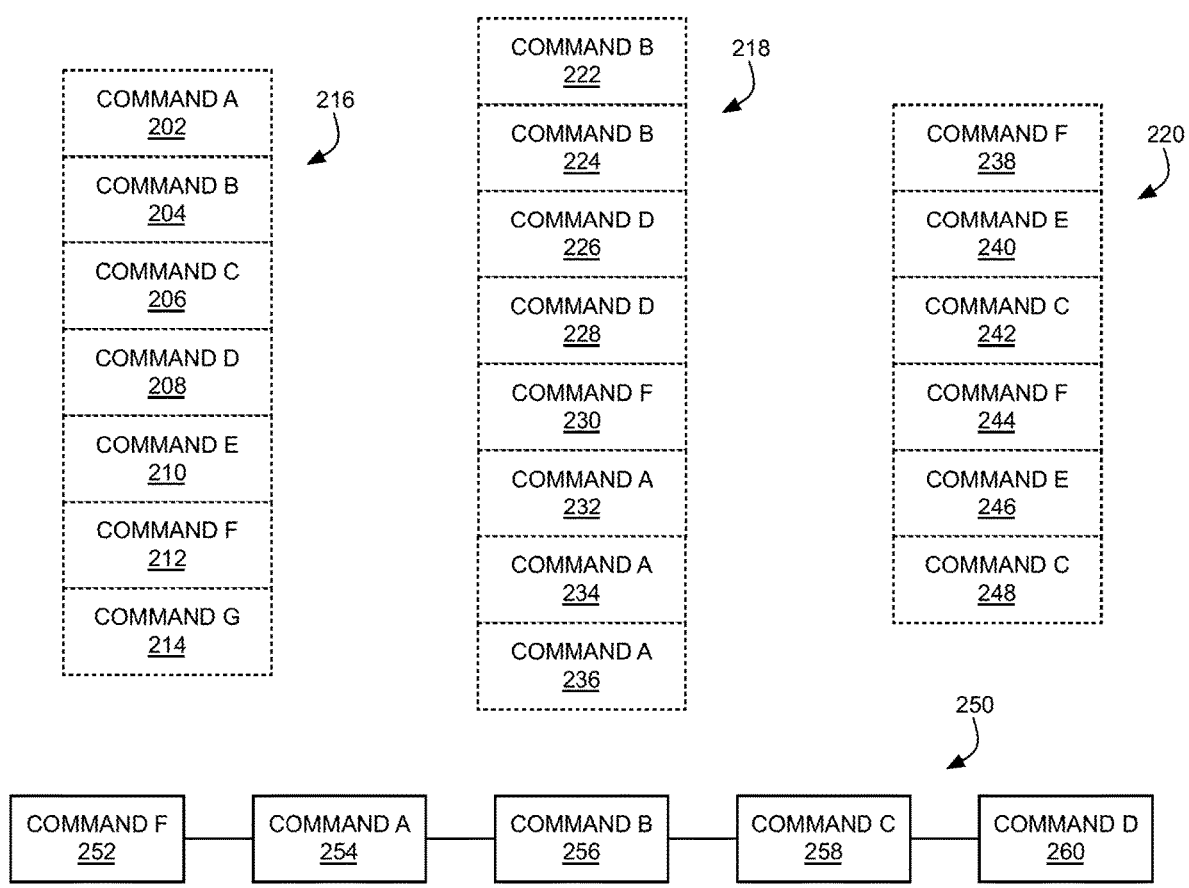
FIG. 2 shows example command bundles for use with an accelerated hardware architecture.

FIG. 2 shows example command bundles for use with an accelerated hardware architecture (system). Any number of commands may be included in any single command bundle, and the order of the commands within the particular command bundles may be selected and/or determined using an application configured for optimizing the order of commands in a particular command bundle based on the arrangement of hardware modules in a particular system.

There are many aspects to consider when generating an arrangement of hardware modules in a particular system. Some of these aspects include, but are not limited to, a total number of hardware modules the particular system, a type of command associated with each hardware module, a number of hardware modules associated with the same type of command, the presence of load balancers, interfaces configured to choose from among several different pipelines (collection of routing nodes and associated hardware modules), number of recirculations allowed, etc. Each of these aspects is described in more detail herein.

The application may optimize the individual commands included in a command bundle along with an order for the included commands, in order to achieve a desired outcome from processing the command bundle using one or more particular processing pipelines. Moreover, each command comprises instructions or functions that are to be executed and/or processed, and each instruction or function may reference, utilize, and/or generate one or more arguments, parameters, outcomes, or values.

As shown, Command A 202 is first in command bundle 216, followed by Command B 204, Command C 206, Command D 208, Command E 210, Command F 212, and Command G 214. Command bundle 218 begins with two instances of Command B 222, 224, followed by two instances of Command D 226, 228, one Command F 230, and concludes with three instances of Command A 232, 234, 236. Command bundle 220 repeats a pattern two times, such that Command F 238, Command E 240, and Command C 242 are followed by another pattern of Command F 244, Command E 246, and Command C 248.

In an example, assume that each of these command bundles are provided to a particular pipeline 250 that includes an ordered set of hardware modules capable of processing commands in the following order: Command F—Command A—Command B—Command C—Command D. The architecture of the pipeline 250 is simplified as a series of modules in this diagram. However, each individual module comprise a routing node that is coupled to one or more hardware modules configured to process the specific command type shown for the module. For the pipeline 250, each module, once it receives a command bundle, will traverse the command bundle until it reaches a command that it is configured to process. The module will process the command (is possible) and forward on the command bundle to the next module. The command bundle may be modified to indicate processing of a command in some instances. For the sake of these descriptions, once a module processes a command, the command will be removed from the command bundle.

In this example, for command bundle 216, the first module 252 would traverse command bundle 216 until it reached Command F 212 and it would process that command. The first module 252 would also forward the command bundle 216 to the second module 254, which would process the first command in command bundle 216 (Command A 202) and forward on the command bundle 216. The third module 256 would receive command bundle 216 from the second module 254, and would traverse the command bundle 216 until it reached and processed the second command (Command B 204). The third module 256 would also forward the command bundle 216 to the fourth module 258. The fourth module 258 would traverse the command bundle 216 until it reached and processed the third command in command bundle 216 (Command C 206). The fourth module 258 would also forward the command bundle 216 to the fifth module 260. The fifth module 260 would traverse command bundle 216 until it reached the fourth command (Command D 208) and it would process that command. No other modules are present in the pipeline 250 for processing commands, so the remaining commands in command bundle 216 (e.g., Command E 210 and Command G 212) would remain unprocessed, no matter how many times the command bundle 216 was recirculated through the pipeline 250.

Continuing with this example, for command bundle 218, the first module 252 would traverse command bundle 218 until it reached the first Command F 230 and it would process that command. The first module 252 would also forward the command bundle 218 to the second module 254, which would traverse the command bundle 218 until reaching and processing the first Command A 232 in command bundle 218. The second module would also forward on the command bundle 218 to the third module 256, which would receive command bundle 218 and process the first Command B 222. The third module 256 would also forward the command bundle 218 to the fourth module 258. The fourth module 258 would traverse the command bundle 218 and not encounter any commands that it could process, and pass the command bundle 218 to the fifth module 260. The fifth module 260 would traverse command bundle 218 until it reached the first Command D 226 and it would process that command. No other modules are present in the pipeline 250 for processing commands, so the remaining commands in command bundle 218 (e.g., Command B 224, Command D 228, Command A 234, and Command A 236) would remain unprocessed unless the command bundle was passed through a recirculation to be processed again by pipeline 250. After passing through pipeline 250 for a second time, only Command A 236 would remain in the bundle.

Sending command bundle 220 through pipeline 250 in this example would result in the following actions. The first module 252 would process the first Command F 238 and forward the command bundle 220 to the second module 254, which would traverse the command bundle 220 without finding any commands to process. Therefore, the second module 254 would forward command bundle 220 unchanged to the third module 256, which would also traverse the command bundle 220 without finding any commands to process, so it would forward the command bundle 220 to the fourth module 258. The fourth module 258 would traverse the command bundle 220 to reach the first Command C 242, process the command, and pass the command bundle 220 to the fifth module 260. The fifth module 260 would traverse command bundle 220 and not find any commands to process, leaving Command E 240, Command F 244, Command E 246, and Command C 248 in the command bundle 220 after a first pass through pipeline 250. After passing through pipeline 250 for a second time, all that would remain in the command bundle 220 would be Command E 240 and Command E 246, because there are no modules in the pipeline 250 capable of processing commands of type E.

2.3. System Overview

Figure 3A:
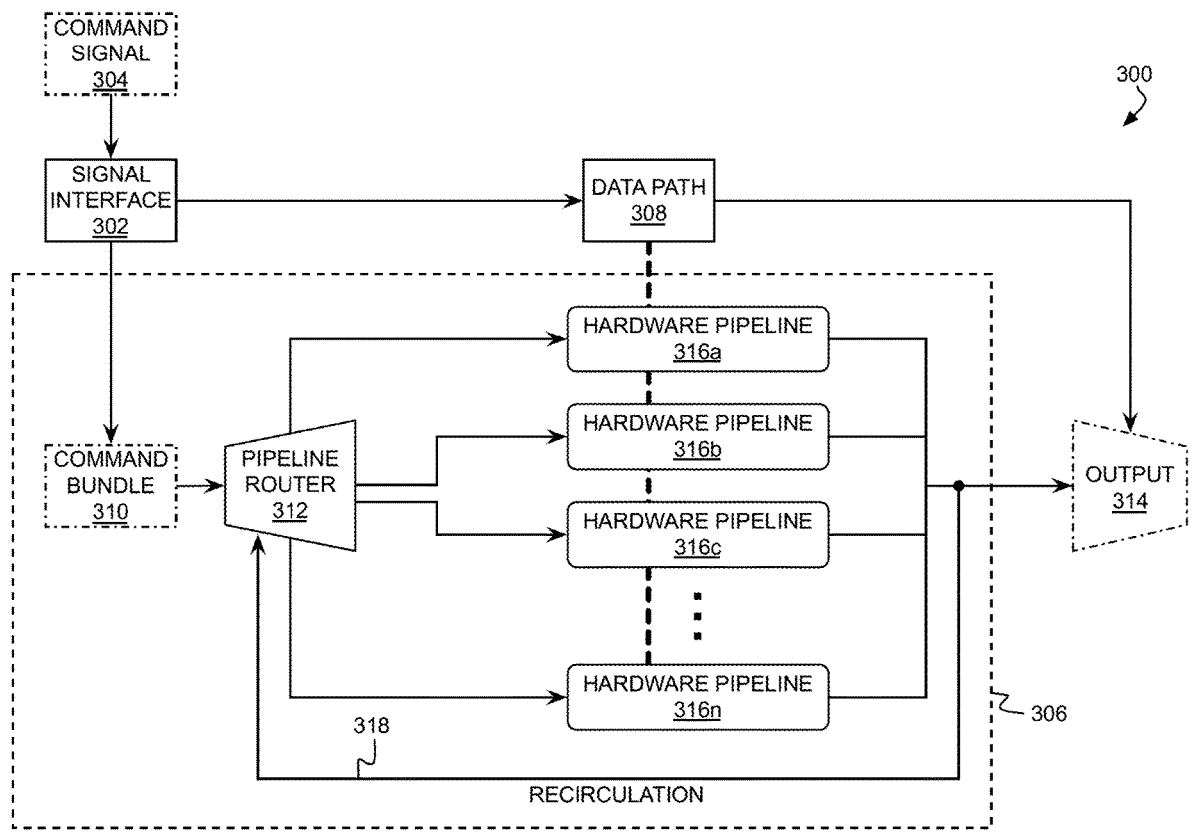
FIG. 3A shows a block diagram of an example system having a pipeline router.

FIG. 3A shows a block diagram of an example system 300 having a pipeline router 312 in accordance with an embodiment. System 300 includes a signal interface 302 configured to split a command signal 304 into at least two components: a command bundle 310 which is provided to a control path 306, and a data stream comprising associated data which is provided to a data path 308. An output 314 is produced once commands of a command bundle 310 have been executed, and may include data from the control path 306 and/or the data path 308, in various approaches.

The signal interface 302 may be implemented in hardware, software, or a combination of hardware and software. The signal interface 302 is configured to receive the command signal 304 and determine which portions of the command signal 304 include commands for processing that are packaged into the command bundle 310, and which portions of the command signal 304 include data (e.g., user data, metadata, parameters, parameter values, etc.) which may be used to process the various commands in the command bundle 310. The data stream is sent along the data path 308 separate from the command bundle 310 which is sent along the control path 306.

According to one embodiment, multiple signal interfaces 302 may be included in a single system, with each signal interface 302 being coupled to its own control path 306 and data path 306. In this way, the plurality of signal interfaces 302 may select to process a particular command signal 304 (in lieu of deferring for another signal interface to process the command signal 304) based on a number of factors, including but not limited to, the availability of hardware pipeline(s), commands to be processed in the command signal 304, arrangement of the hardware pipeline(s), etc.

In one embodiment, the control path 306 is configured to utilize a fixed size of argument (each command in a command bundle 310), such as 16 bits, 32 bits, 64 bits, 128 bits, etc. In an alternate embodiment, the control path 306 is configured to utilize a variable size of argument (each command in a command bundle 310), with a maximum argument size being selected by a designer or by default, such as 32 bits, 64 bits, 128 bits, 256 bits, 512 bits, etc.

In an embodiment, the data path 308 is configured to utilize a variable size of argument (data associated with commands in the command bundle 310), with a maximum argument size being selected by a designer or by default, such as 32 bits, 64 bits, 128 bits, 256 bits, 512 bits, etc. In an alternate embodiment, the data path 308 is configured to utilize a fixed size of argument (data associated with commands in the command bundle 310), such as 16 bits, 32 bits, 64 bits, 128 bits, etc.

According to an approach, the data path 308 is asynchronous to the control path 306, such that the data portion of the command signal 304 may be transmitted along the data path 308 independently from the command bundle 310 being transmitted along the control path 306, initially and after recirculating along the recirculation loop 318.

Once the command bundle 310 is generated, it is provided to the control path 306. In an embodiment, a pipeline router 312 receives the command bundle 310 prior to forwarding the command bundle 310 to a selected hardware pipeline 316. The pipeline router 312 is implemented in hardware in one embodiment. In an approach, the pipeline router 312 may be implemented in hardware with configuration changes possible via software in another embodiment. According to another approach, the pipeline router 312 may be implemented in software.

The pipeline router 312 is configured to determine which hardware pipeline 316 from a group of hardware pipelines (e.g., hardware pipeline 316a, hardware pipeline 316b, hardware pipeline 316c, . . . , hardware pipeline 316n) is best suited for processing the commands in command bundle 310. Each hardware pipeline 316 comprises an ordered series of modules (not shown) for processing commands. Each module includes a routing node coupled to one or more associated hardware modules for processing commands of a certain type, with any number of modules being possible in any particular hardware pipeline 316 (limited only by constraints on hardware architecture: physical space and layout, and a desired minimum time to traverse a hardware pipeline).

The pipeline router 312 may utilize the individual arrangements of each hardware pipeline 316 (which types of commands may be processed by components of the pipeline), knowledge of which hardware pipelines 316 are available for processing additional commands at any given time, which type of commands are included in the command bundle 310, and an order of the commands in the command bundle 310 to make the determination of which hardware pipeline 316 to send a particular command bundle 310. The choice of which hardware pipeline 316 to use for a particular command bundle 310 may also be used in choosing which hardware pipeline 316 to use for a next received command bundle 310 in an approach. The command bundle 310 may be split into multiple portions by the pipeline router 312, with the portions being transmitted to different hardware pipelines 316 in an approach.

According to an embodiment, the pipeline router 312 (or some other suitable component of system 300) may selectively provide individual commands of the command bundle 310 to different hardware pipelines 316 and/or routing nodes within specific hardware pipelines 316 to allow for parallel execution by different hardware modules associated with the different routing nodes concurrently or at nearly the same time (e.g., based on slight differences in when the commands are actually received by the different hardware modules).

In one embodiment, the routing nodes (and thus associated hardware modules for processing commands of certain types) within each particular hardware pipeline 316 are arranged in a particular order. In this embodiment, the pipeline router 312 is configured to select a particular hardware pipeline (e.g., hardware pipeline 316a instead of any of the other hardware pipelines 316b, 316c, . . . , 316n) to transmit the command bundle 310 based on one or more criteria. The criteria includes, but is not limited to, an order of commands in the command bundle 310, command types of the commands in the command bundle 310, metadata in the command bundle 310 and/or in the data path 308, and availability of individual hardware pipelines 316 for processing commands. Once the pipeline router 312 selects the particular hardware pipeline (e.g., hardware pipeline 316a), the command bundle 310 is transmitted to the particular hardware pipeline.

In an alternate embodiment, system 300 may include a single hardware pipeline 316 comprising an ordered series of modules, each module including a routing node coupled to one or more associated hardware modules for processing commands of a certain type. In this embodiment, no pipeline router 312 would be used. However, the signal interface 302 would still be present for splitting the command signal 304 into components for the control path 306 and data path 308 as described previously.

In an embodiment, a hardware pipeline 316 may include one or more storage devices (such as buffers, memories, registers, etc.). The storage device(s) are configured to store data for use by a routing node and/or hardware module within the hardware pipeline 316. According to one embodiment, each set of routing node/hardware module(s) includes at least one storage device for use in processing commands of a command bundle 310.

In an embodiment, the control path 306 may include a recirculation loop 318 which allows for a command bundle 310 to be sent back to the pipeline router 312 and/or a hardware pipeline 316 for continued processing after having been passed through a selected hardware pipeline. In this embodiment, the pipeline router 312 may be configured to perform additional tasks after transmitting the command bundle 310 to the selected hardware pipeline. For example, the pipeline router 312 may be configured to determine whether at least one command in the command bundle 310 has not been executed by a hardware module of the selected hardware pipeline. Also, responsive to determining that the at least one command in the command bundle 310 has not been executed after being returned along the recirculation loop 318, the command bundle 310 may again be transmitted to at least one selected hardware pipeline 316. The same hardware pipeline may be used in one embodiment. In another embodiment, one or more different hardware pipelines may be used for continued processing of the command bundle 310, with or without the originally selected hardware pipeline.

Upon receiving the command bundle 310 at the pipeline router 312 from the recirculation loop 318, the pipeline router 312 (or some other component of system 300) is configured to determine a number of times that the command bundle 310 has been transmitted through the control path 306 (e.g., a selected hardware pipeline 316). In response to determining that at least one command in the command bundle 310 has not been executed, and the number of times that the command bundle 310 has been sent through the control path 306 exceeds a configurable threshold (e.g., 2 times, 3 times, 5 times, 10 times, etc.), the pipeline router 312 generates an error indicating that processing of the command bundle 310 has failed.

In another embodiment, the pipeline router 312 (or some other component of system 300) is configured to determine an amount of time that has elapsed since the command bundle 310 was transmitted through the control path 306 (e.g., a selected hardware pipeline) the first time. In response to determining that at least one command in the command bundle 310 has not been executed after receiving the command bundle 310 from the recirculation loop 318, and that the elapsed amount of time exceeds a configurable duration threshold (e.g., 100 microseconds, 10 milliseconds, 1 second, 10 seconds, 30 seconds, etc. —the total amount of time allowed for a command bundle to complete processing including recirculation attempts), the pipeline router 312 generates an error indicating that processing of the command bundle 310 has failed. This approach is helpful to ensure that a command bundle 310 that may never complete processing is not repeatedly sent back through the control path 306. The command bundle 310 may never complete processing due to some unforeseen issue with the command bundle 310, the arrangement of the hardware pipeline(s) 316, or both.

In an approach, the pipeline router 312 (or some other component of system 300) is configured to determine an amount of time that has elapsed since the command bundle 310 was transmitted through the control path 306 (e.g., a selected hardware pipeline). In response to determining that the elapsed amount of time exceeds a configurable pass-through threshold (e.g., 100 microseconds, 10 milliseconds, 1 second, 10 seconds, 30 seconds, etc. —the amount of time allowed for a command bundle to complete processing once through), the pipeline router 312 may re-transmit the command bundle 310 back through the selected hardware pipeline or along another hardware pipeline. This approach is helpful to ensure that a command bundle 310 does not get "stuck" or slowed-down in a hardware pipeline and never or only very slowly completes processing, due to some unforeseen issue with the command bundle 310, the arrangement of the hardware pipeline(s) 316, or both.

In one example, each of the hardware modules associated with the routing nodes in a particular hardware pipeline 316 may be configured to execute a same command type (e.g., all hardware modules in hardware pipeline 316c may process fetch and/or store commands). Moreover, the pipeline router 312 may be configured to perform load balancing across each the plurality of hardware modules associated with the plurality of routing nodes in hardware pipeline 316c. Load balancing ensures that different command bundles 310 and/or individual commands within command bundles 310 are load-balanced across the particular hardware modules in hardware pipeline 316c to more efficiently utilize the fetch command processing of the hardware pipeline 316c.

Figure 3B:
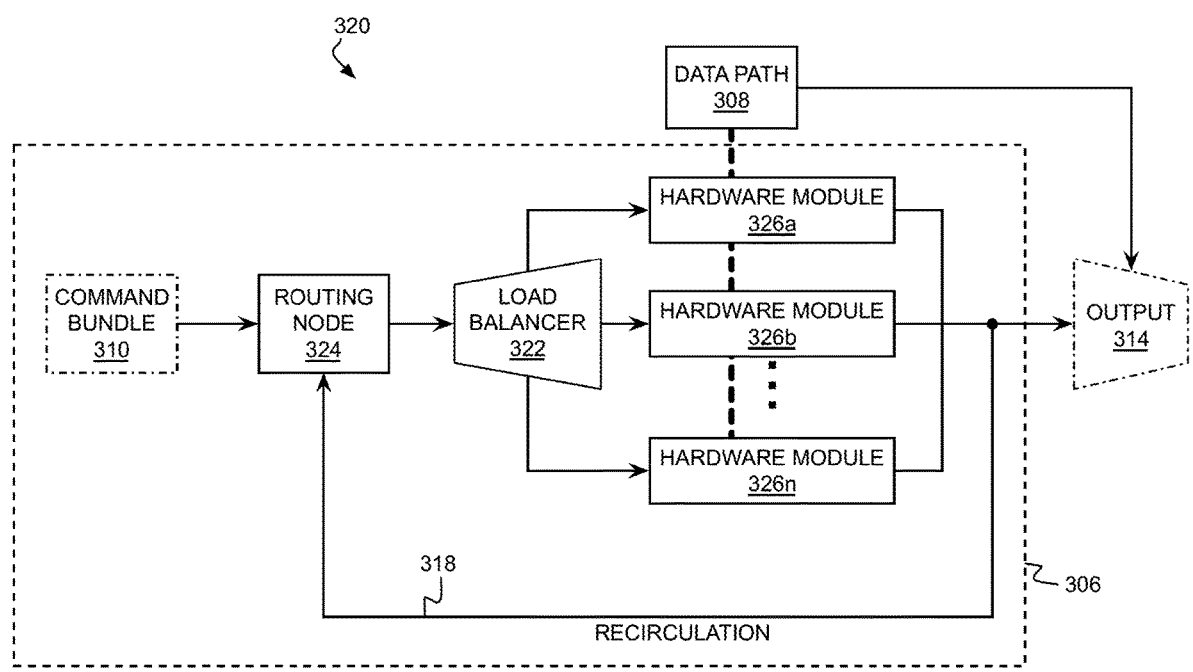
FIG. 3B shows a block diagram of an example system having a load balancer.

FIG. 3B shows a block diagram of an example system 320 having a load balancer 322 in accordance with an embodiment. System 320 includes a routing node 324 communicatively coupled to a plurality of hardware modules 326 (e.g., hardware module 326a, hardware module 326b, . . . , hardware module 326n). Each hardware module 326 is coupled to a data path 308 for accessing data associated with the various commands of the command bundle 310.

An output 314 is produced once commands of a command bundle 310 have been executed, and may include data from the control path 306 and/or the data path 308, in various approaches. A recirculation loop 318 is provided for recycling the command bundle 310 back to the routing node 324 (or the load balancer 322 in some implementations) for processing by the various hardware modules 326 one or more additional times. The recirculation loop 318 may be used when at least one command remains in the command bundle 310 after being passed through the various hardware modules 326.

In one implementation, the load balancer 322 may be integrated into the routing node 324. In other words, the routing node 324 may be configured to perform load balancing across the plurality of hardware modules 326 communicatively coupled thereto. Load balancing may account for any number of factors or aspects. These factors or aspects may be related to any of the hardware modules 326, the command bundle 310, an order of commands within the command bundle 310, the type of commands within the command bundle 310, a number of recirculations performed and/or allowed, etc.

Some hardware modules 326 are configured to execute more than one command type. However, the multiple command types that are able to be executed typically are related in some way, such as encrypt and decrypt, fetch and store, compress and decompress, etc. In this way, hardware modules 326 may execute different command types, but the command types are related (e.g., similar commands).

In system 320, each hardware module 326 is configured to execute the same or similar commands, and the routing node 324 has knowledge of the specific command(s) executable by the plurality of hardware modules 326. The command bundle 310 is received by routing node 324, which determines which commands in the command bundle 310 are executable by the various hardware modules 326. These selected commands are sent to the load balancer 322, which distributes the selected commands across the plurality of hardware modules 326 to be executed in parallel. In this way, multiple commands may be executed concurrently or at nearly the same time (based on slight differences in when the commands are actually received by the different hardware modules 326).

According to one approach, a plurality of routing nodes may be arranged in a particular order within a hardware pipeline in accordance with software-defined rules. A composer application associated with the command-aware hardware architecture may adhere to the software-defined rules in choosing and/or selecting how to arrange individual routing nodes within a particular hardware pipeline. The software-defined rules may include rules for managing the number of routing nodes (and associated at least one hardware module), rules for positioning routing nodes within a hardware pipeline, rules associated with load-balancing and hardware pipeline routing, etc.

The rules for positioning routing nodes may include, but are not limited to, which types of routing nodes (dictated by a type of command that a hardware module associated with a routing node is configured to process) may or must be positioned next to one another, which types of routing nodes may or must be positioned before another type of routing node, which types of routing nodes may be positioned after another type of routing node, etc.), how many of the same type of routing nodes may be positioned in series, etc.

The rules for managing the number of routing nodes may include, but are not limited to, a total number of routing nodes in a particular hardware pipeline, a minimum number of routing nodes in any hardware pipeline, a number of routing nodes that may be repeated in series, etc.

The rules associated with load-balancing may include, but are not limited to, distributing processing loads according to a scheme or metric across multiple hardware pipelines, and distributing loads across hardware modules which execute the same or similar command type within a single hardware pipeline. When distributing processing loads across multiple hardware pipelines, a load-balancer may ensure that each hardware pipeline is utilized in accordance with the scheme or metric over a certain period of time, avoiding busy or unavailable hardware pipelines when selecting which hardware pipeline to send a command bundle, etc. When distributing loads across hardware modules which execute the same or similar command type, a load-balancer may ensure that each hardware module is utilized approximately equally, that loads are directed to available hardware modules, that loads are directed with knowledge of ordering concerns within the command bundle, etc.

According to one embodiment, a cluster of systems 300 and/or 320 may be implemented as a single unit, controlled to operate together to process commands of varying types. This arrangement is helpful when the compute functions need to be distributed across multiple FPGAs and/or ASICs.

An application that a designer desires to execute in an accelerated manner, either using ASICs, FPGAs, CPUs, GPUs, etc., may be implemented using the general architecture of system 300 and/or 320. This provides the designer with the ability to aggregate individual instructions and functions from the application into a series of command bundles (a program) which may be made to specify the input and output interfaces of the program, the compute modules (each comprising a routing node and associated hardware module(s)), a series of commands that are executed in the program, an order in which the commands are executed, and a relationship and dependency between each command.

In an approach, the system 300 and/or 320 and software controlling the system 300 and/or 320 do not need to be modified every time a new compute function is introduced or an existing compute function is changed. This allows a designer to generate FPGA accelerated applications using a common architecture. In one approach, when utilizing an FPGA-based hardware architecture, system 300 and/or 320 provides the ability to leverage re-programmability of FPGAs to support different sets of compute functions for different applications, and make changes that cause the capability of the processor architecture to change as desired.

Usually, redesigning an FPGA may take significant amounts of time (e.g., multiple weeks or months), and a lot of effort and resources may be needed to make such changes. When the FPGA is redesigned, the software programming interface often changes, which requires a change to the software stack.

However, a software-based composer application provided with system 300 and/or 320 is configured to build a new system architecture on-demand. This new system architecture accounts for certain characteristics of the FPGA being used for compute functions in system 300 and/or 320, including the vendor of the FPGA platform, the specific FPGA platform, capability of the specific FPGA (e.g., features, an order to instantiate the features, and order of execution for the features), and a bandwidth of the FPGA (e.g., speed provided by each feature and the overall FPGA).

In one embodiment, the composer application receives input from the designer, automatically configures the parameters and assembles the required features in an appropriate fashion to dynamically build a system that comprises a signal interface 302, control path 306, data path 308, and at least one hardware pipeline on the defined FPGA platform. In this way, a truly dynamic hardware computing platform is possible, and the configurable hardware platform may be repurposed on-demand to serve novel and current needs of the end-user and specific application tasks.

3. EXAMPLE EMBODIMENTS

A detailed example is described below for purposes of clarity. Components and/or operations described below should be understood as one specific example which may not be applicable to certain embodiments. Accordingly, components and/or operations described below should not be construed as limiting the scope of any of the claims.

3.1 Hardware Routing Mesh

Figure 4A:
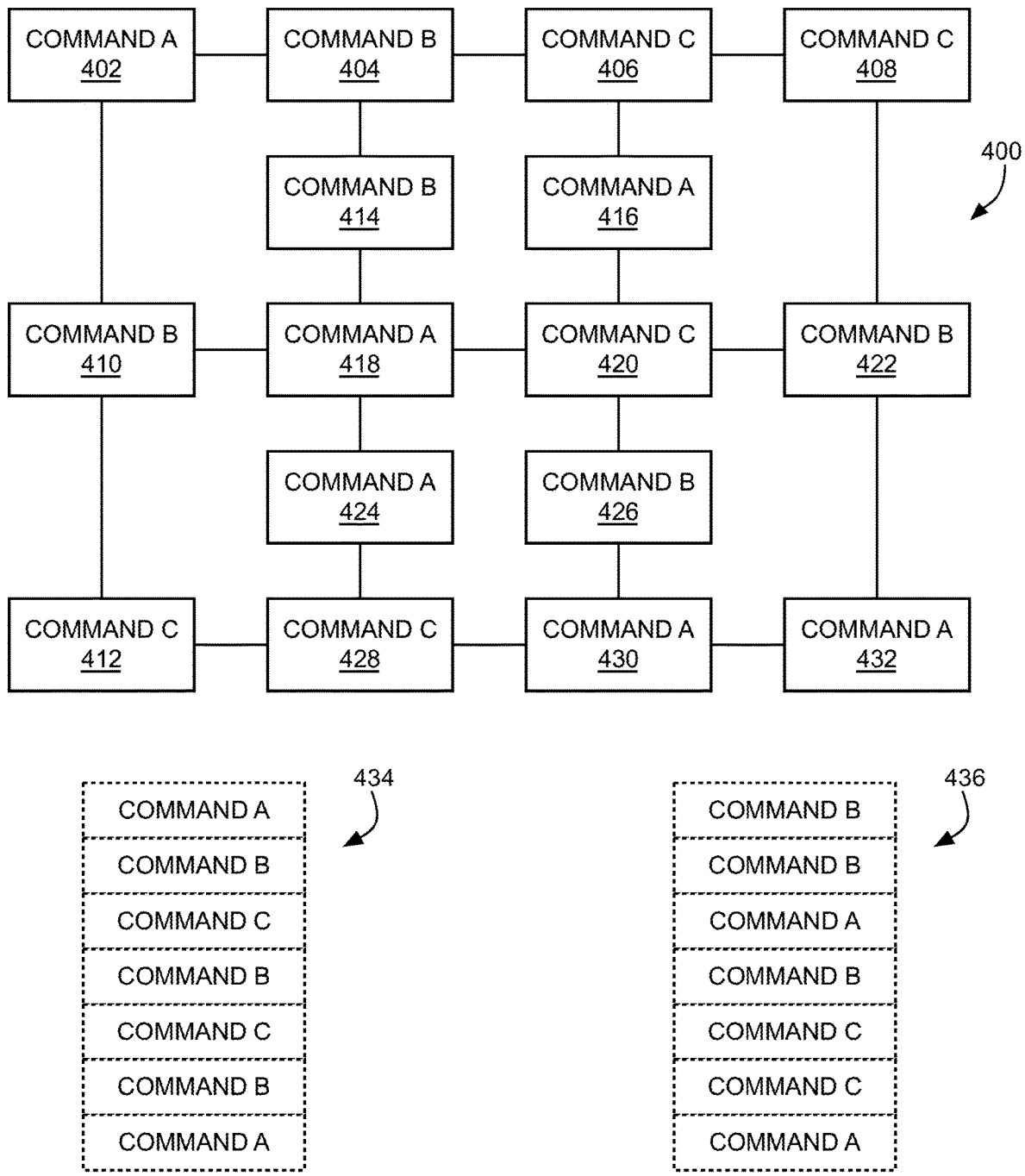
FIGS. 4A-4C show a hardware routing mesh and example pipelines chosen for processing commands.
Figure 4B:
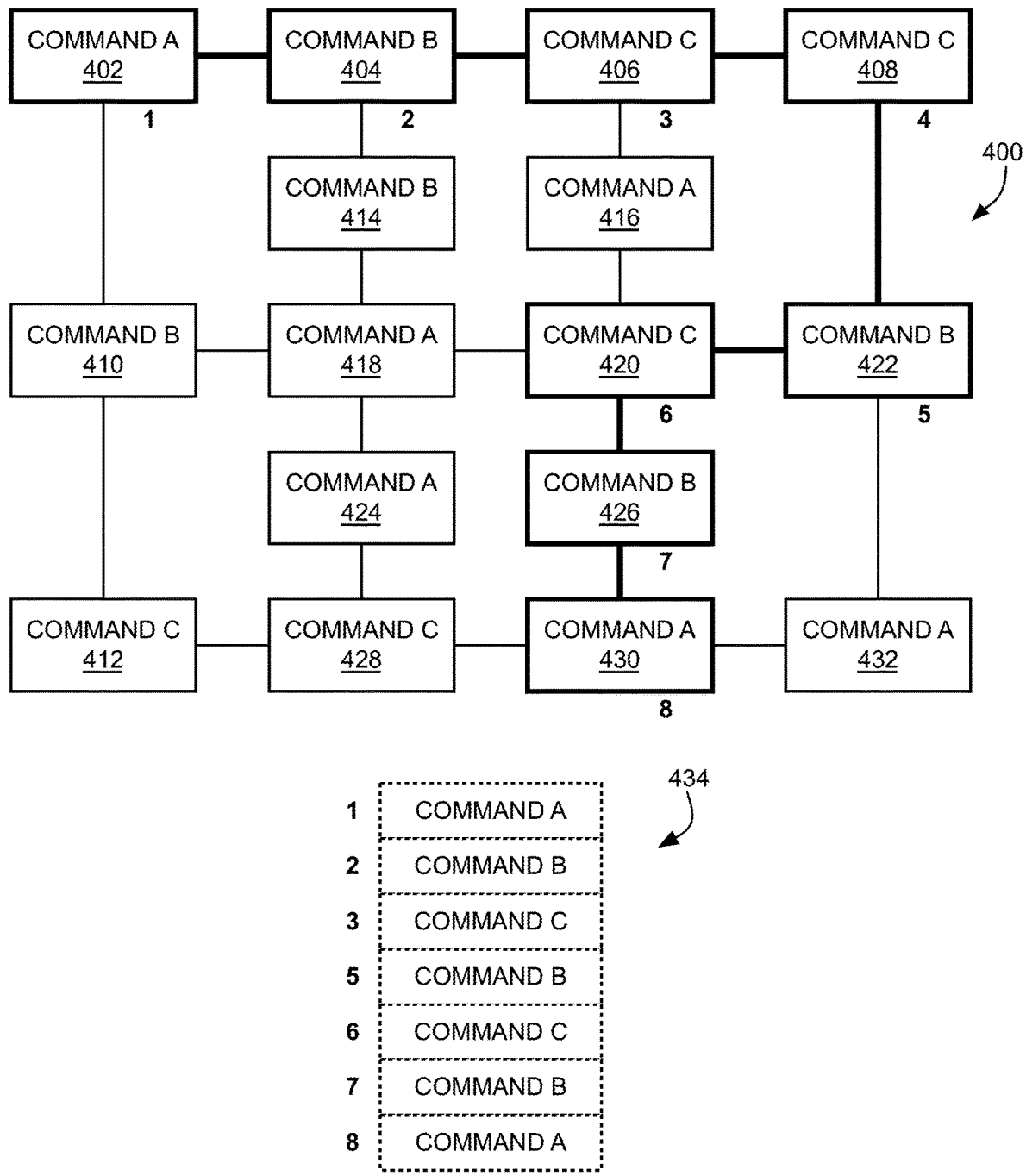
Figure 4C:
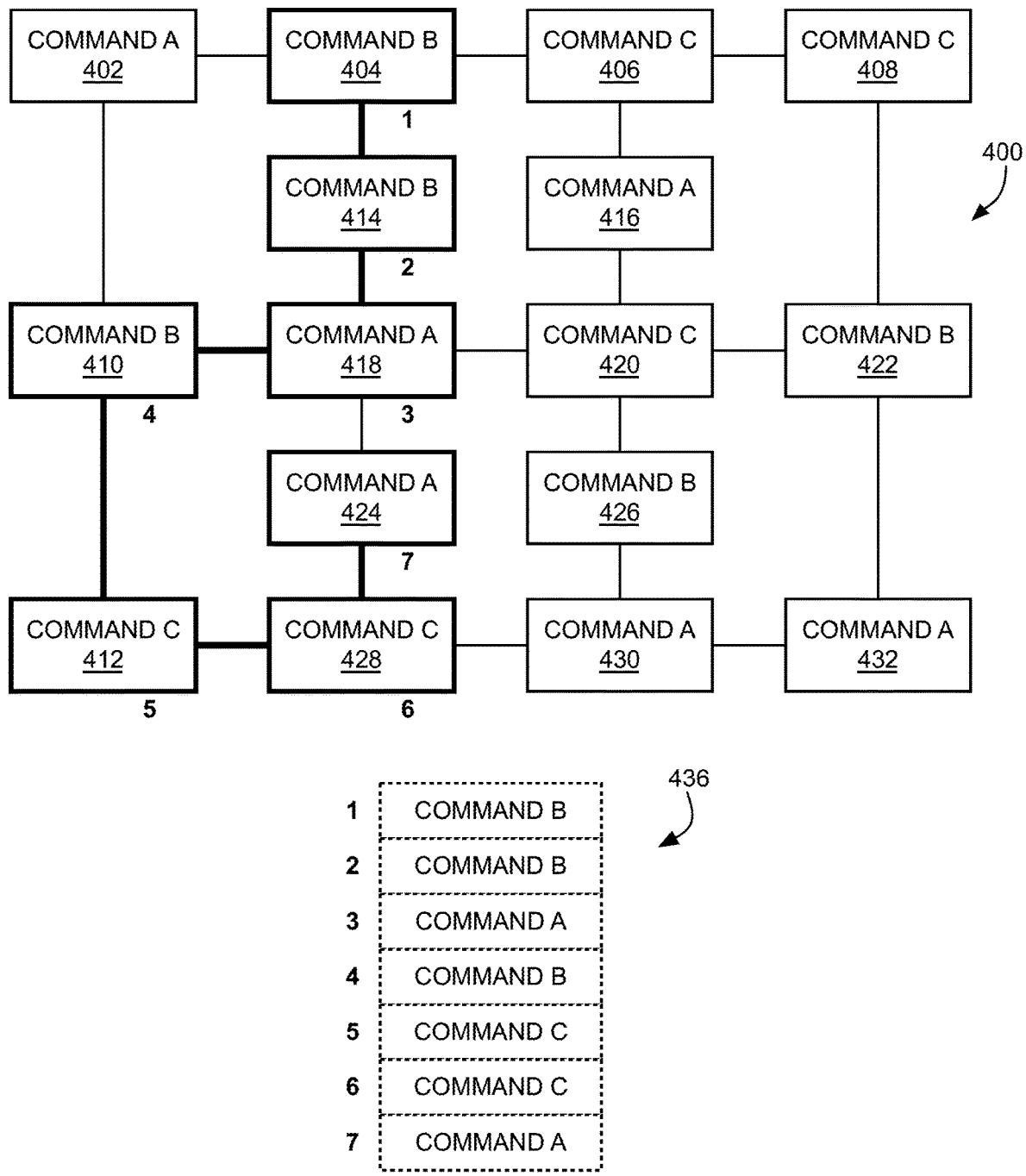

FIGS. 4A-4C show a hardware routing mesh 400 and example pipelines chosen for processing commands. The hardware routing mesh 400 comprises a plurality of hardware modules configured to process different command types. For simplicity, only three command types are included in the hardware routing mesh 400: Command type A, Command type B, and Command type C. The connections between the various hardware modules are for example only, and any interconnections, any number of hardware modules, any specific commands and command types, and any arrangement of the hardware modules may be used in a hardware routing mesh in various approaches.

FIG. 4A also shows two example command bundles. Command bundle 434 comprises, in order: Command A—Command B—Command C—Command B—Command C—Command B—Command A. Command bundle 436 comprises, in order: Command B—Command B—Command A—Command B—Command C—Command C—Command A. The hardware routing mesh 400 is capable of being used in any desired arrangement for selecting a hardware pipeline therefrom, as long as a connection exists between the desired hardware modules, and a hardware module is not used twice in a single pipeline.

FIG. 4B shows an example hardware pipeline chosen through hardware routing mesh 400 intended to optimize processing of command bundle 434. The selected hardware pipeline starts with hardware module 402 (configured to process command type A), followed by hardware module 404 (configured to process command type B), hardware module 406 (configured to process command type C), hardware module 408 (configured to process command type C), hardware module 422 (configured to process command type B), hardware module 420 (configured to process command type C), hardware module 426 (configured to process command type B), and ending with hardware module 430 (configured to process command type A). The individual hardware modules that are used to process each command in command bundle 434 are indicated with numbers beside the commands in the command bundle 434. Of note here is that hardware module 408 is not used to process any commands in command bundle 434, but it is included in the hardware pipeline because it creates the shortest route through the hardware routing mesh 400 that includes each required hardware module in the required order. There are other pipeline configurations possible that will also result in all commands in command bundle 434 being processed, and they may include the same number of hardware modules (8) or have more hardware modules.

A composer application will attempt to optimize the selection of the hardware pipeline(s) through any given hardware routing mesh based on processing request it receives that details what functions are to be processed.

FIG. 4C shows an example hardware pipeline chosen through hardware routing mesh 400 intended to optimize processing of command bundle 436. The selected hardware pipeline starts with hardware module 404 (configured to process command type B), followed by hardware module 414 (configured to process command type B), hardware module 418 (configured to process command type A), hardware module 410 (configured to process command type B), hardware module 412 (configured to process command type C), hardware module 428 (configured to process command type C), and ending with hardware module 424 (configured to process command type A).

The individual hardware modules that are used to process each command in command bundle 436 are indicated with numbers beside the commands in the command bundle 436. It is noted that the exact amount of hardware modules are included in the chosen hardware pipeline as the number of commands in command bundle 436—an optimal solution. There are other pipeline configurations possible that will also result in all commands in command bundle 436 being processed, and they may include the same number of hardware modules (7) or have more hardware modules.

The examples shown in FIGS. 4A-4C illustrate how the same hardware routing mesh 400 may be configured to perform different functions in a different order based on a pipeline selection of the hardware modules included in the hardware routing mesh 400. The selection of the hardware pipeline(s) by the composer application may consider many factors in making this decision, including but not limited to, a current arrangement of the hardware routing mesh, number and types of commands in a command bundle, presence or absence of a recirculation loop, number and position of hardware modules capable of processing each command type, etc.

3.2 Method for Processing a Command

Figure 5:
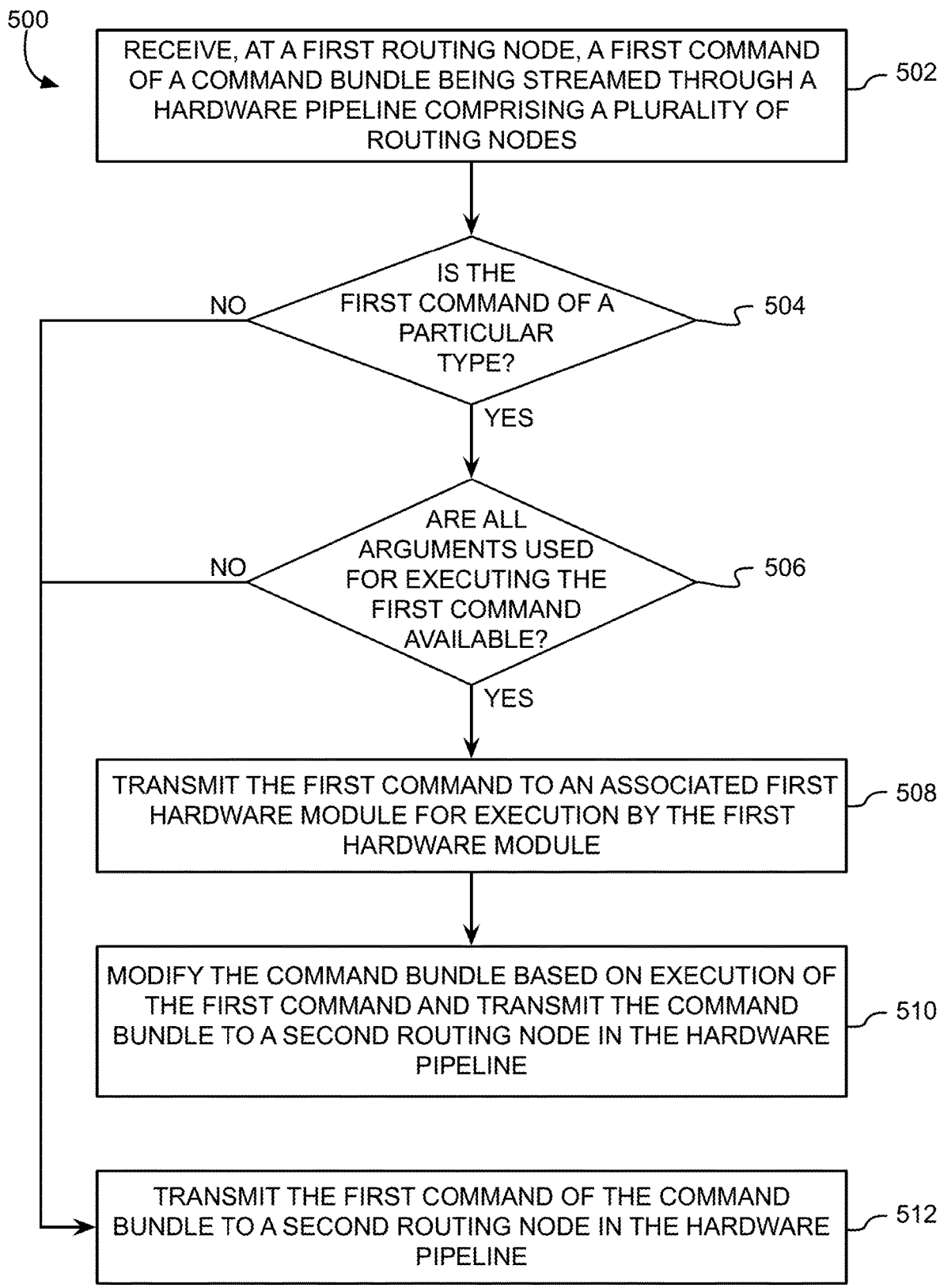
FIG. 5 is a flow diagram of an example method for processing a command from a command bundle using a routing node.

FIG. 5 illustrates an example method 500 for processing a command from a command bundle using a routing node in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In addition, method 500 may be implemented using a hardware routing mesh that includes a plurality of routing nodes. Each routing node is associated with one or more hardware modules. Each hardware module is configured to process a certain type of command dependent on the individual hardware module (e.g., different command types may be processed by the different hardware modules in the hardware routing mesh).

In operation 502, a first routing node in a hardware pipeline of a hardware routing mesh receives a first command of a command bundle. The command bundle is streamed through the plurality of routing nodes of the hardware pipeline. Moreover, as commands in the command bundle are processed and/or executed, the command bundle is modified based on such execution of commands.

In operation 504, the first routing nodes determines whether the first command is of a particular type that a first hardware module communicatively coupled to the first routing node is configured to process. In response to a "Yes" determination indicating that the first command is of the particular type, method 500 continues to operation 506; otherwise, method 500 jumps to operation 512.

In operation 506, the first routing nodes determines whether all arguments used for executing the first command are available (if any arguments are specified by the first command). In response to a "Yes" determination indicating that all arguments are available, method 500 continues to operation 508; otherwise, method 500 jumps to operation 512.

In operation 508, the first routing node transmits the first command to the first hardware module in order for the first hardware module to execute and/or process the first command. In one embodiment, the first routing node may also transmit any arguments necessary for executing the first command to the first hardware module, with the arguments being obtained from a data path and/or from metadata associated with commands in the command bundle.

In operation 510, the first routing node modifies the command bundle based on execution of the first command. In one embodiment, modifying the command bundle may include, at a minimum, refraining from transmitting the first command of the command bundle to the second routing node. This is performed in order to ensure that the first command is not repeated by any other hardware modules of the hardware pipeline.

According to an approach, the command bundle may be modified to include an indicator (e.g., pointer, link, marker, flag, etc.) denoting execution of the first command. The indicator may be placed anywhere in the command bundle, such as in metadata associated with the command bundle, in a position where the first command is or was located in the command bundle, at an end or beginning of the command bundle, etc.

In another approach, the command bundle may be modified to store a result of executing the first command in a dataset associated with the first command of the command bundle. The dataset may be stored to the data path, in the command bundle, and/or in a memory device associated with the first hardware module, the first routing node, and/or the hardware pipeline.

The result may be an outcome, argument, parameter, value, or some other data that results from execution or processing of the first command. For example, if the first command is a fetch command, the result is the data that the first command instructs to fetch from storage.

In another approach, the command bundle may be modified to store an indicator for the result in the command bundle. The indicator (e.g., pointer, link, marker, flag, etc.) may directly or indirectly point to a location where the result is stored.

In other approaches, the command bundle may be modified to remove the first command from the command bundle, and/or add a data command in place of the first command in the command bundle. The data command may refer to a location to access the result of executing the first command.

In another approach, the command bundle may be modified to add the data command in addition to the first command in the command bundle.

In yet another approach, the command bundle may be modified by generating a new command bundle that includes no commands (e.g., an empty command bundle) that may replace or be sent along the control path in addition to the command bundle.

In operation 512, responsive to determining that (a) the first command is not of the particular command type associated with the first hardware module, or (b) at least one argument used for executing the first command is not available, the first routing node transmits the first command of the command bundle to a second routing node in the hardware pipeline. The first command is forwarded on down the hardware pipeline because the first routing node is not able to process the first command at this time.

3.3 Method for Traversing a Command Bundle with a Routing Node

Figure 6:
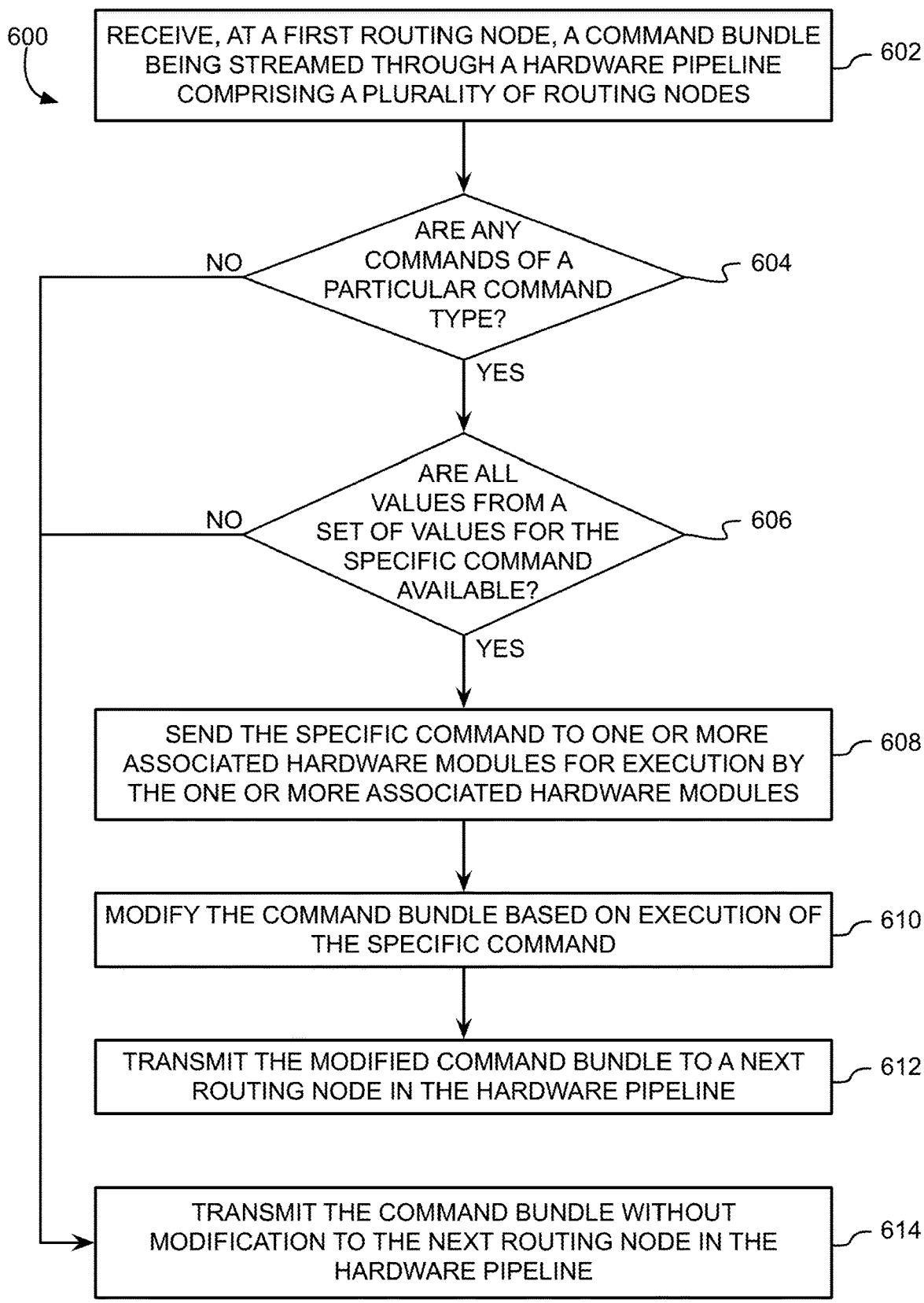
FIG. 6 is a flow diagram of an example method for traversing a command bundle with a routing node.

FIG. 6 illustrates an example method 600 for traversing a command bundle with a routing node in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In addition, method 600 may be implemented using a hardware routing mesh that includes a plurality of routing nodes. Each routing node is associated with one or more hardware modules. Each hardware module is configured to process a certain type of command dependent on the individual hardware module (e.g., different command types may be processed by the different hardware modules in the hardware routing mesh).

In operation 602, a particular routing node in a hardware pipeline of a hardware routing mesh receives a command bundle. The command bundle may be passed by a routing node in the hardware pipeline, forwarded by a pipeline router, received through a recirculation loop, or obtained in some other way through the hardware routing mesh.

The command bundle includes an ordered set of commands, with each command provided instructions and/or functions to be processed and/or executed. In some instances, a command may also include or make reference to one or more arguments, parameters, and/or values that are used to process/execute the command. The command bundle is streamed through the plurality of routing nodes of the hardware pipeline. Moreover, as commands in the command bundle are processed and/or executed, the command bundle is modified based on such execution of commands.

In operation 604, the particular routing node traverses the command bundle to determine whether the command bundle includes any commands of a particular command type. Traversing the command bundle allows the particular routing node to examine a type of command for each command in the command bundle. In this way, the particular routing node is able to determine whether the command bundle includes any commands of the particular command type that one or more hardware modules associated with the particular routing node are configured to process and/or execute. If there are no commands of a type that can be processed and/or executed by the particular routing node's hardware module(s), then the command bundle may be passed on or ignored by the particular routing node.

The method 600 continues to operation 606 in response to a "Yes" determination that the command bundle includes at least one command of the particular command type; otherwise, method 600 jumps to operation 614.

In operation 606, the particular routing node determines whether all values are available from a set of one or more values that correspond to a set of parameters for any specific command of the particular command type. Being available indicates that the values have been received by the particular routing node, received by the associated hardware module(s), the particular routing node is aware of a location to obtain the values, and/or the associated hardware module(s) are aware of the location to obtain the values.

Each command in the command bundle that is of the particular command type is analyzed in this way to determine whether all values are available for at least one of the commands of the particular command type that is present in the command bundle.

The method 600 continues to operation 608 in response to a "Yes" determination that all values are available from the set of one or more values that correspond to the set of parameters for the specific command; otherwise, method 600 jumps to operation 614.

In operation 608, the particular routing node sends the specific command to one or more associated hardware modules to process and/or execute the specific command. In an embodiment, the set of one or more values that correspond to the set of parameters for the specific command are utilized to process and/or execute the specific command, e.g., the specific command is executed based on the set of one or more values. Moreover, a result may be produced based on the one or more associated hardware modules processing and/or executing the specific command.

In an approach, the result may be stored to a memory device of the particular routing node, a memory device associated with the one or more associated hardware modules, in a data set on the data path, in a data command, etc.

In operation 610, the first routing node modifies the command bundle based on execution of the specific command. In one embodiment, modifying the command bundle may include, at a minimum, refraining from transmitting the specific command of the command bundle to the next routing node in the hardware pipeline. This is performed in order to ensure that the specific command is not repeated by any other hardware modules of the hardware pipeline.

According to an approach, the command bundle may be modified to include an indicator (e.g., pointer, link, marker, flag, etc.) denoting execution of the specific command. The indicator may be placed anywhere in the command bundle, such as in metadata associated with the command bundle, in a position where the specific command is or was located in the command bundle, at an end or beginning of the command bundle, etc.

In another approach, the command bundle may be modified to store a result of executing the specific command in a dataset associated with the specific command of the command bundle. The dataset may be stored to the data path, in the command bundle, and/or in a memory device associated with the hardware module(s), the particular routing node, and/or the hardware pipeline.

The result may be an outcome, argument, parameter, value, or some other data that results from execution or processing of the specific command. For example, if the specific command is a fetch command, the result is the data that the specific command retrieves.

In another approach, the command bundle may be modified to store an indicator for the result in the command bundle. The indicator (e.g., pointer, link, marker, flag, etc.) may directly or indirectly point to a location where the result is stored.

In other approaches, the command bundle may be modified to remove the specific command from the command bundle, and/or add a data command in place of the specific command in the command bundle. The data command may refer to a location to access the result of executing the specific command.

In another approach, the command bundle may be modified to add the data command in addition to the specific command in the command bundle.

In yet another approach, the command bundle may be modified by generating a new command bundle that includes no commands (e.g., an empty command bundle) that may replace or be sent along the control path in addition to the command bundle.

In operation 612, the first routing node transmits the modified command bundle to a next routing node in the hardware pipeline. The command bundle progresses along the control path to reach each routing node in the hardware pipeline.

In operation 614, the particular routing node transmits the command bundle, without modification, to the next routing node in the hardware pipeline. The particular routing node forwards on the command bundle without processing any commands therefrom in response to determining that the command bundle does not include any commands of the particular command type, or in response to failing to detect at least one value in the set of one or more values corresponding to the set of parameters for the specific command.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. MISCELLANEOUS; EXTENSIONS

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, datacenter servers, networking devices or any other device that incorporates hard-wired and/or program logic to implement the techniques.

Figure 7:
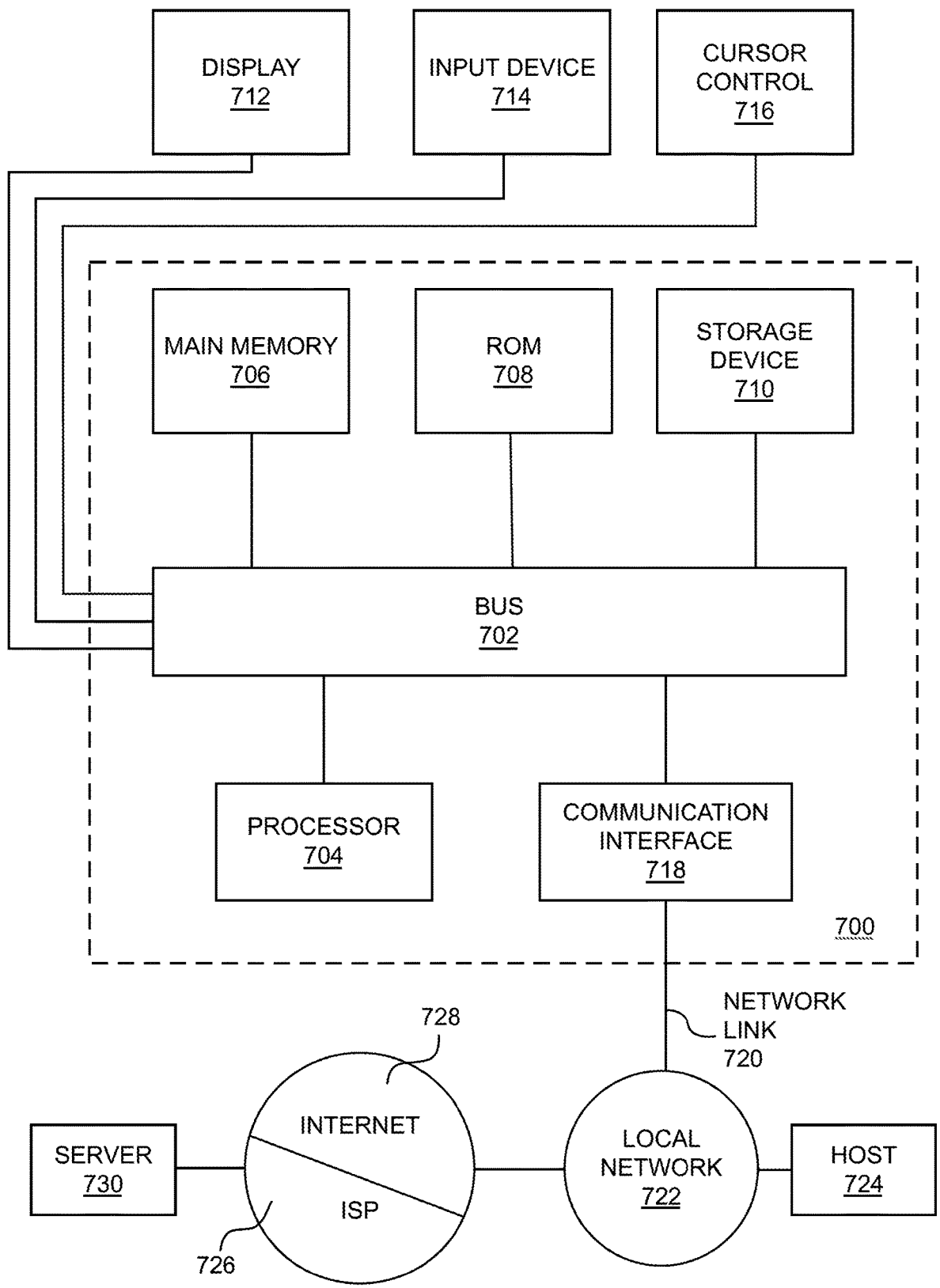
FIG. 7 shows a block diagram of an example computing system that may implement the features and processes of FIGS. 1-6.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or solid state disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

What is claimed is:

1. A hardware routing mesh, comprising:
   a plurality of routing nodes associated respectively with a plurality of hardware modules,
   the plurality of routing nodes comprising a first routing node communicatively coupled to a first hardware module of the plurality of hardware modules,
   wherein the first routing node is configured to perform:
      receiving a first command of a command bundle being streamed through the plurality of routing nodes;
      responsive to determining that (a) the first command is of a particular command type associated with the first hardware module, and (b) arguments used by the first command are received in association with the first command: transmitting the first command to the first hardware module for execution by the first hardware module; and
      modifying the command bundle based on execution of the first command, the modifying comprising refraining from transmitting the first command of the command bundle to a second routing node.

2. The hardware routing mesh of claim 1, wherein the second routing node is communicatively coupled to a second hardware module of the plurality of hardware modules, the second routing node being configured to perform:
   receiving the command bundle;
   traversing the command bundle and determining that the command bundle does not include any commands of a second command type; and
   responsive to determining that the command bundle does not include any commands of the second command type: transmitting the command bundle, without modification, to a third routing node.

3. The hardware routing mesh of claim 1, wherein the second routing node is communicatively coupled to a second hardware module of the plurality of hardware modules, the second routing node being configured to perform:
   receiving the command bundle;
   traversing the command bundle and detecting a specific command of a second command type within the command bundle;
   failing to detect at least one value in a set of one or more values corresponding to a set of parameters for the specific command; and
   responsive to the failing to detect the at least one value in the set of one or more values: transmitting the command bundle, without modification, to a third routing node.

4. The hardware routing mesh of claim 3, wherein the second routing node, subsequent to transmitting the command bundle to the third routing node, is configured to perform:
   receiving the command bundle again and traversing the command bundle to detect the specific command of the second command type within the command bundle;
   detecting all values of the set of one or more values corresponding to the set of parameters for the specific command;
   responsive to detecting the set of one or more values: executing the specific command based on the set of one or more values;

modifying the command bundle based on execution of the specific command; and responsive to modifying the command bundle: transmitting the command bundle to the third routing node.

5. The hardware routing mesh of claim 1, wherein modifying the command bundle based on execution of the first command comprises at least one action selected from a group comprising:

modifying the command bundle to include an indicator denoting execution of the first command;
 storing a result of executing the first command in a dataset associated with the first command of the command bundle;
 storing an indicator for the result in the command bundle;
 removal of the first command from the command bundle;
 adding a data command in place of the first command in the command bundle, the data command referring to a location to access the result of executing the first command;
 adding the data command in addition to the first command in the command bundle; and
 generating a new command bundle that includes no commands.

6. The hardware routing mesh of claim 1, wherein individual commands of the command bundle are selectively provided to different routing nodes of the plurality of routing nodes for parallel execution by the different routing nodes.

7. The hardware routing mesh of claim 1, wherein the first routing node is communicatively coupled to a plurality of first hardware modules that are configured to execute a same command type.

8. The hardware routing mesh of claim 7, further comprising a load balancer configured to perform load balancing of commands across the plurality of first hardware modules communicatively coupled to the first routing node.

9. The hardware routing mesh of claim 1, further comprising an interface configured to perform:

splitting a command signal into (a) the command bundle, and (b) a data stream; and
 transmitting the command bundle along a control path and the data stream along a data path to an initial routing node of the plurality of routing nodes.

10. The hardware routing mesh of claim 9, wherein the command bundle includes one or more indicators corresponding to one or more datasets in the data stream.

11. The hardware routing mesh of claim 1, wherein the first routing node is further configured to perform:

receiving a second command of the command bundle; and
 responsive to determining that (a) the second command is not of the particular command type associated with the first hardware module, or (b) at least one argument used for executing the second command is not received in association with the second command: transmitting the second command to the second routing node.

12. A routing node, comprising:

first hardware logic configured to receive and parse a command bundle to determine types of commands included in the command bundle, wherein the command bundle is modified based on execution of commands prior to being passed by the routing node;
 second hardware logic in communication with the first hardware logic, the second hardware logic being configured to transmit a first command of the command bundle to a first hardware module for execution by the first hardware module responsive to determining that (a) the first command is of a particular command type associated with the first hardware module, and (b) arguments used by the first command are received in association with the first command; and
 third hardware logic in communication with the second hardware logic, the third hardware logic being configured to modify the command bundle based on execution of the first command by refraining from transmitting the first command of the command bundle to a second routing node.

13. The routing node of claim 12, further comprising:

fourth hardware logic in communication with the second hardware logic, the fourth hardware logic being configured to transmit a second command of the command bundle to the second routing node responsive to determining that (a) the second command is not of the particular command type associated with the first hardware module, or (b) at least one argument used for executing the second command is not received in association with the second command.

14. The routing node of claim 12, wherein the routing node is communicatively coupled to a plurality of first hardware modules that are configured to execute a same command type.

15. The routing node of claim 12, wherein the third hardware logic configured to modify the command bundle performs at least one action selected from a group comprising:

modifying the command bundle to include an indicator denoting execution of the first command;
 storing a result of executing the first command in a dataset associated with the first command of the command bundle;
 storing an indicator for the result in the command bundle;
 removal of the first command from the command bundle;
 adding a data command in place of the first command in the command bundle, the data command referring to a location to access the result of executing the first command;
 adding the data command in addition to the first command in the command bundle; and
 generating a new command bundle that includes no commands.

16. A method, comprising:

receiving, by a first routing node of a plurality of routing nodes, a first command of a command bundle being streamed through the plurality of routing nodes;
 responsive to determining that (a) the first command is of a particular command type associated with the first hardware module, and (b) arguments used by the first command are received in association with the first command: transmitting, by the first routing node, the first command to the first hardware module for execution by the first hardware module; and
 modifying, by the first routing node, the command bundle based on execution of the first command, the modifying comprising refraining from transmitting the first command of the command bundle to a second routing node.

17. The method of claim 16, further comprising:

receiving a second command of the command bundle; and
 responsive to determining that (a) the second command is not of the particular command type associated with the first hardware module, or (b) at least one argument used for executing the second command is not received in association with the second command: transmitting the second command to the second routing node.

18. The method of claim 16, wherein the first routing node is communicatively coupled to a plurality of first hardware modules that are configured to execute a same command type.

19. The method of claim 16, wherein modifying the command bundle based on execution of the first command comprises at least one action selected from a group comprising:

modifying the command bundle to include an indicator denoting execution of the first command;
storing a result of executing the first command in a dataset associated with the first command of the command bundle;
storing an indicator for the result in the command bundle;
removal of the first command from the command bundle;
adding a data command in place of the first command in the command bundle, the data command referring to a location to access the result of executing the first command;
adding the data command in addition to the first command in the command bundle; and
generating a new command bundle that includes no commands.

20. The method of claim 16, further comprising:
selectively providing individual commands of the command bundle to different routing nodes of the plurality of routing nodes for parallel execution by the different routing nodes.

* * * * *